Sept. 29, 1953 W. A. DERR 2,653,998

REMOTE-CONTROL SYSTEM

Filed Feb. 23, 1949 3 Sheets-Sheet 1

WITNESSES:
E. A. McClaskey.
J. V. Giolma

INVENTOR
Willard A. Derr.
BY
G. M. Crawford
ATTORNEY

Sept. 29, 1953 W. A. DERR 2,653,998

REMOTE-CONTROL SYSTEM

Filed Feb. 23, 1949 3 Sheets-Sheet 2

WITNESSES:
F. V. Giolma
E. A. McElhattey

INVENTOR
Willard A. Derr.
BY G. D. Crawford
ATTORNEY

Sept. 29, 1953 W. A. DERR 2,653,998

REMOTE-CONTROL SYSTEM

Filed Feb. 23, 1949

3 Sheets-Sheet 3

WITNESSES:
E. A. McCloskey
G. V. Giolma

INVENTOR
Willard A. Derr.
BY
G. M. Crawford
ATTORNEY

Patented Sept. 29, 1953 2,653,998

UNITED STATES PATENT OFFICE 2,653,998

REMOTE-CONTROL SYSTEM

Willard A. Derr, Pittsburgh, Pa., assignor to Westinghouse Electric Corporation, East Pittsburgh, Pa., a corporation of Pennsylvania Application February 23, 1949, Serial No. 77,738

17 Claims. (Cl. 179—2.5)

Figure 1:
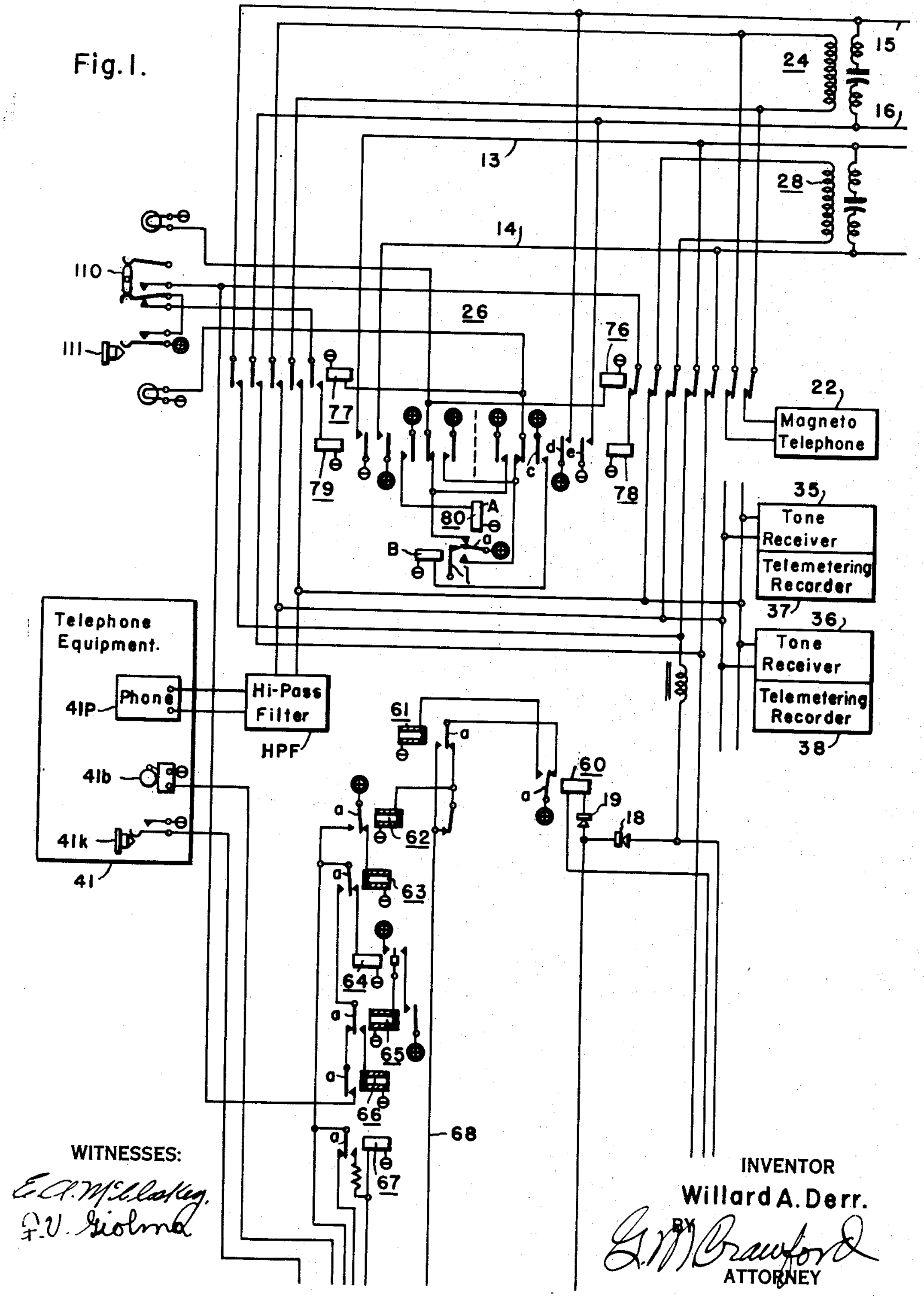

My invention relates, generally, to remote control systems, and it has reference in particular to supervisory control systems.

Generally stated, it is an object of my invention to provide a supervisory control system that is simple and inexpensive to manufacture, and reliable and effective in operation.

More specifically, it is an object of my invention to provide, in a supervisory control system, for utilizing both direct-current and alternating-current signal voltages over a common signal channel.

Another object of my invention is to provide, in a supervisory control system, for normally using one of two signal channels as the main channel, and for transferring automatically to the other or spare channel in the event of a fault on the main channel.

Yet another object of my invention is to provide, in a supervisory control system, for effecting telephone communication between a dispatching office and a station remote from a substation, over an extension line between the substation and the remote station, through the supervisory control equipment.

It is an important object of my invention to provide, in a supervisory control system, for normally utilizing a main signal channel for supervisory control and a spare signal channel for local telephone communication, and utilizing transfer means non-responsive to a telephone ringing voltage for transferring the supervisory control equipment from the main to the spare signal channel.

Another important object of my invention is to provide, in a supervisory control system, for obtaining telephone communication with a station remote from the substation by operating a carrier frequency transmitter at the substation from the dispatching office.

It is also an object of my invention to provide, in a supervisory control system, for selecting a telephone point by momentarily depressing a point selection key which automatically initiates selection of the telephone point, rings the telephone at a remote station for a predetermined time, and then releases the supervisory control equipment.

Other objects will in part be obvious, and will in part be explained hereinafter.

In practicing my invention in one of its forms, one signal channel between a dispatching office and a substation is utilized for a direct-current impulse supervisory control system. Continuous telemetering is maintained over this channel independently of the supervisory control equipment through insulating transformers by using different frequencies for each metering operation. A spare signal channel is normally connected for use with a local telephone circuit between the dispatching office and the substation, and the supervisory control equipment is automatically transferred thereto in the event of a fault on the main signal channel. Telephone communication is effected between the dispatching office and station remote from the substation, such as a hydro station, by utilizing carrier frequency communication equipment at the substation and at the remote station, which are connected over a power line. The supervisory control equipment is used between the dispatching office and the substation for operating the carrier frequency equipment at the dispatching office to transmit to the remote station, and for receiving incoming calls from the remote station to the dispatching office.

Figure 1A:
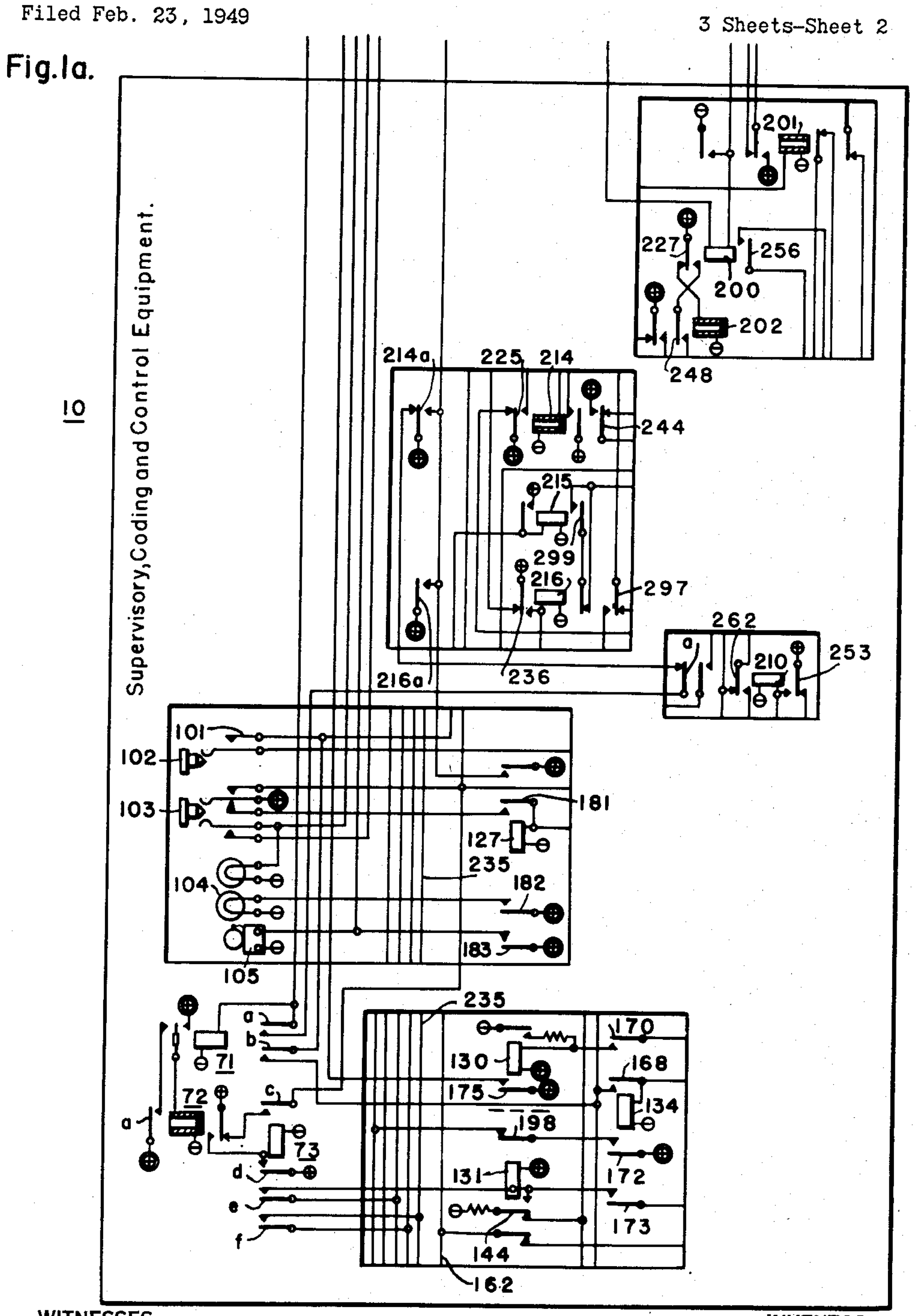
Figure 2:
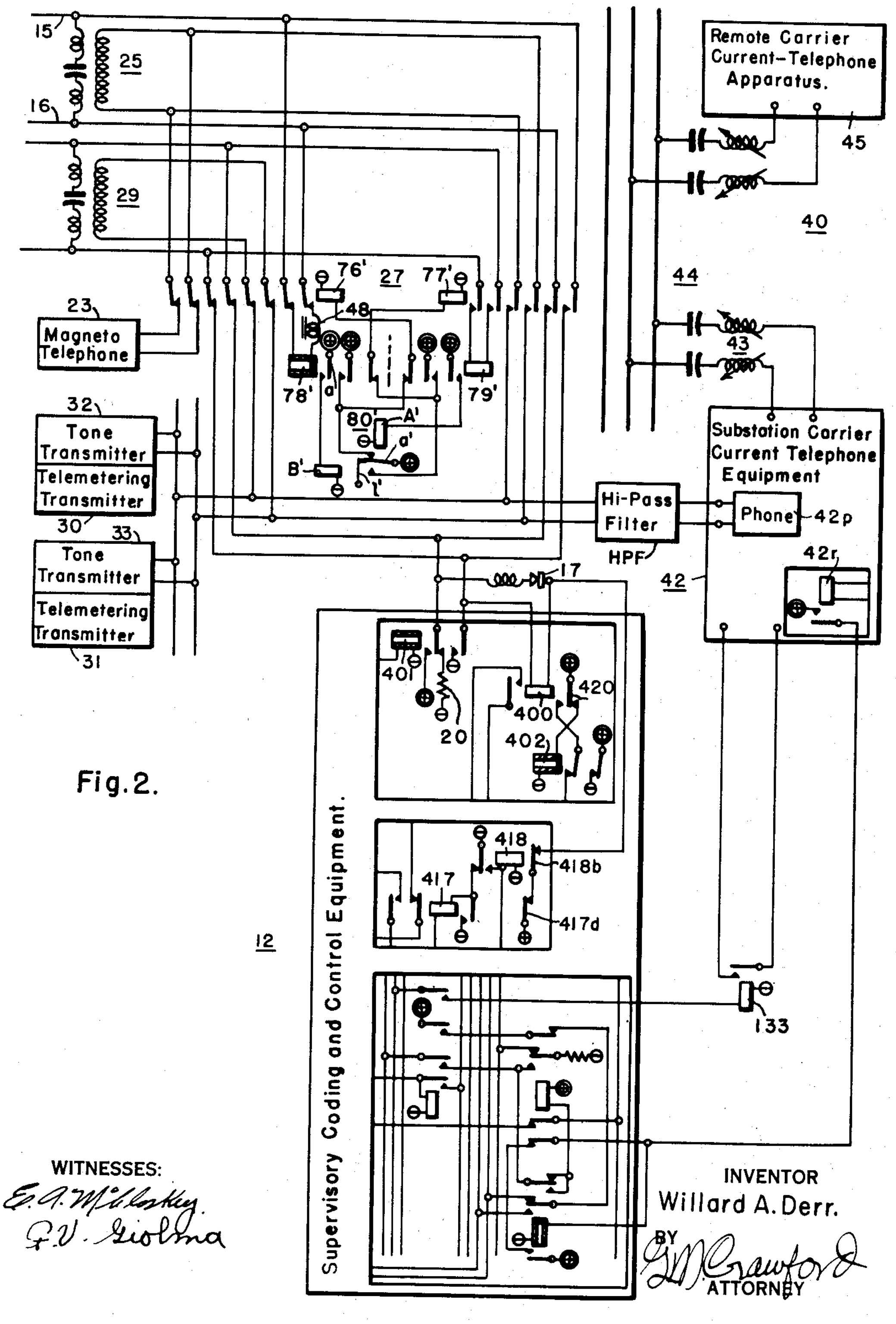

For a more complete understanding of the nature and scope of my invention, reference may be made to the following detailed description, which may be read in connection with the accompanying drawings, in which:

Figures 1 and 1*a*, together are a diagrammatic view of the supervisory control equipment, transfer equipment, telephone equipment, and telemetering equipment at the dispatching office in a supervisory control system embodying the invention in one of its forms, and Fig. 2 is a diagrammatic view of the supervisory control equipment and transfer equipment at the substation and remote station, together with the carrier communication equipment at the substation and remote station.

Referring generally to the drawings, the reference numeral 10 may denote the supervisory coding and control equipment at a dispatching office disposed to operate in conjunction with supervisory coding and control equipment 12 at a substation, which may be connected to the dispatching office by a main signal channel comprising conductors 13 and 14, and a spare signal channel comprising conductors 15 and 16.

The supervisory coding and control equipment at the dispatching office and the substation is substantially identical with that described in detail in Patent No. 2,091,301 which issued on August 31, 1937, to H. P. Boswau, and is for purposes of simplification represented generally by the enclosures 10 and 12 at the dispatching office and substation, respectively. Corresponding parts are identified by the same numerals appearing in the drawings of the Boswau patent. Changes in the circuits and apparatus of the Boswau patent are illustrated in detail through windows in the enclosures 10 and 12, and additional apparatus, equipment, and circuits are designated by numbers not appearing in the Boswau patent, so as to avoid confusion.

The line relays 200 and 400 at the dispatching office and substation of Boswau have been reconnected in the present instance to provide a shunt circuit arrangement in which the line relays are normally deenergized, instead of normally energized as in the series circuit arrangement of the Boswau patent. Likewise, the connections to the armatures 227 and 420 of the line relays have been changed to compensate for the normally deenergized condition of the line relays.

In order to maintain supervision of the line conductors 13 and 14, a line supervision relay 60 may be provided at the dispatching office and connected by means of rectifier devices 17, 18 and 19 in series circuit relation with the line conductors and the line relays 200 and 400. By energizing the line conductors from the substation battery through a current limiting resistor 20, and armatures **418*b* and 417*d* of the substation start relays 418 and 417, respectively, the line supervisory relay 60 may be maintained in a normally energized position without effecting operation of the line relays 200 and 400**.

An auxiliary control relay 61 of the delayed dropout type may be utilized for deenergizing auxiliary line supervisory relays 62 and 63 of the delayed dropout type, which are normally energized through the armature *a* of line supervisory relay 60, and armature *a* of relay 61. The relays 62 and 63 may be provided for controlling the operation of a time delay relay 64 of the pendulum type and an auxiliary time delay relay 65 to effect operation of a line transfer control relay 66 when a fault occurs on the main signal channel.

The auxiliary supervision relay 62 may be provided with a holding circuit extending through conductor 68 and armatures **214*a* and 216*a* of the reset relay 214 and the selection and operation starting relay 216, respectively, for preventing relay 62** from becoming deenergized during operation of the supervisory control equipment.

An alarm reset relay 67 may be provided for interrupting the energizing circuit of an alarm bell 105 which is energized when the auxiliary line supervisory relay 62 drops to indicate a line fault.

The spare signal channel comprising conductors 15 and 16 may be normally used to provide local telephone communication between the dispatching office and the substation by means of magneto telephones 22 and 23 which may be connected to the line conductors through insulating transformers 24 and 25, respectively.

In order to provide for maintaining continuity of service between the dispatching office and the substation, transfer means represented generally by the numerals 26 and 27 may be provided at the dispatching office and the substation, respectively, for transferring the supervisory control equipment from the main signal channel to the spare signal channel in the event of a fault on the main signal channel.

The transfer means may comprise main line switches 76 and 76' at the dispatching office and substation, respectively, normally disposed to connect the supervisory control equipment to the main signal channel conductors 13 and 14 through insulating transformers 28 and 29, respectively. The magneto telephones 22 and 23 may be normally connected to the conductors 15 and 16 of the spare signal channel by the main line switches 76 and 76'.

Spare line switches 77 and 77' may be provided at the dispatching office and substation, respectively, for connecting the supervisory control equipment to the spare signal channel. Spare line auxiliary transfer relays 78 and 78' may be provided for controlling the operation of the spare line switches 77 and 77'. The auxiliary transfer relay 78' may be of the delayed operating type, and a suitable choke device 48 may be utilized to make the relay 78' non-responsive to the usual low frequency ringing voltage of the magneto telephones 22 and 23.

Main line auxiliary transfer relays 79 and 79' may be utilized to control the operation of the main line switches 76 and 76', respectively. Transfer control relays 80 and 80' may be provided for selectively determining the operation of the main and spare line switches. The transfer control relays 80 and 80' may be provided with main line operating windings A and A', and spare line operating windings B and B' for operating the armatures *a* and *a'* to the main and spare line operating positions. Latches *l* and *l'* may be provided for maintaining the armatures *a* and *a'* in the main line position.

Continuous telemetering may be provided between the substation and the dispatching office by means of telemetering transmitters 30 and 31 at the substation, which may be disposed to operate tone transmitters 32 and 33 operating on frequencies of 150 and 209 cycles per second, for example. The transmitters may be normally connected to the main signal channel through the insulating transformer 29 and disposed to be transferred to the spare signal channel when a fault occurs on the main channel. At the dispatching office, tone receivers 35 and 36 tuned to the frequencies of 150 and 209 cycles, respectively, may be utilized to operate telemetering recorders 37 and 38, respectively.

In order to provide for communicating with a station 40 which is remotely located from the substation 12, telephone equipment 41 including a telephone **41*p*, a bell 41*b*, and a telephone call key 41*k* may be provided at the dispatching office for operating through one point of the supervisory control equipment, such as point 4, to effect a ringing operation of carrier frequency communication equipment 42** at the substation. A high pass filter HPF may be used to connect the telephone equipment to the signal channel and block the telemetering frequencies.

The carrier frequency communication equipment may be connected by means of tuned coupling circuits 43 to conductors of a power line 44 which extends to the station 40, and the telephone **42*p* thereof may be connected to the signal channel through a high pass filter HPF. The equipment 42 may also include a ringing relay 42*r***.

At the remote station 40 carrier frequency communication equipment 45 may be coupled to the power line 44 by tuned coupling circuits 43.

In order to provide for automatically selecting the telephone point and ringing the telephone at the remote station 40, the telephone point at the dispatching office may be provided with a timing relay 71 disposed to be operated by the key **41*k* for effecting operation of a telephone release relay 72 which, in turn, operates a telephone selection relay 73**.

The selection relay 73 may be disposed to shunt down the individual point relay 131 of the supervisory control equipment through armature *e* and its front contact in exactly the same manner as the point selection key does in the Boswau patent. The selection relay 73 at the same time provides a connection to the operation code start relay 215 through armature *b* and its front contact, which function is performed by the master control key 102 of the Boswau patent.

A holding circuit is provided for the timing relay 71 through armature *a* of the telephone selection relay to armature *a* of the operation and selection code stop relay 210 and armature 214*a* of the reset relay 214, so as to provide for holding the timing relay 71 energized until the end of the point selection check code, whereupon it will commence the timing cycle to provide a predetermined time for operating the carrier frequency communication equipment to ring for the operator at the remote station 40.

This may be obtained by utilizing an auxiliary relay 133 at the substation 12 which is operated upon selection of the telephone point, through armature *a* of the telephone control code relay 310. The auxiliary relay 133 may be utilized to key the carrier frequency communication equipment 42 to place a ringing signal on the power line 44 to effect a ringing operation of the communication equipment 45 at the remote station 40. The point is held selected during the timing interval of the timing relay 71 thus providing a predetermined timed ringing operation.

The relay 71, which may be of the pendulum type, eventually releases relay 72, so that indirect positive will be placed on the reset relay 214 through armature 72*b* of the release relay 72 and armature *c* of the telephone selection relay 73, in the same manner as if the release key 103 of the Boswau patent were operated.

Normally, the supervisory control equipment will be connected to the conductors 13 and 14 of the main signal channel, since at both the dispatching office and the substation 12 the main line switches 76 and 76′ will be in the energized position; the line transfer control relays 80 and 80′ being latched in the main line positions as shown. The substation battery being connected to the signal channel through a relatively high resistance 20, the line supervision relay 60 will be maintained in the energized position by a limited supervisory current, as well as the auxiliary supervision relays 62 and 63.

Should the main signal channel become open or short circuited, line supervision relay 60 will be deenergized. This provides an obvious energizing circuit for the auxiliary line supervision relay 61, and deenergizes auxiliary line supervision relay 62, which remains energized for a predetermined interval of time. At the end of this time relay 62 drops, and provides an obvious energizing circuit for the time delay relay 64 which, in turn, results in energization of the time delay relay 65 and the transfer control relay 66.

The relay 64 being of the pendulum type, its vibrations become slower and slower, so that relay 65 which is of the slow release type, eventually returns to the deenergized position. An energizing circuit is thereupon provided for the spare line auxiliary transfer relay 78, from positive through armature *a* and back contact of relay 62, armature *a* and back contact of relay 63, armature *a* of the relay 65 and armature *a* of the transfer control relay 66, which remains energized for a predetermined interval of time.

Relay 78 operates to the energized position, and connects the dispatching office battery to the spare line conductors 15 and 16 at armatures *d* and *e*. An obvious energizing circuit for the reset winding B of the line transfer control relay 80 is provided through armature *c* of the auxiliary transfer relay 78.

At the substation relay 78′ will be energized from the conductors 15 and 16, and provides an energizing circuit for reset winding B of the transfer control relay 80′ through armature *a*. Relay 80′ operates to the spare line position, and when relay 78 at the dispatching office releases to drop relay 78′ at the substation relay 77 is operated and switches 76 and 76′ are released at both stations.

This operation transfers the equipment from the main signal line to the spare signal line. The alarm bell 105 is energized through armature *a* and back contact of relay 62. Reset relay 67 is energized when the release key 103 is pushed, interrupting the alarm bell circuit at armature *a*.

The equipment may be restored to the main signal line by operating the line transfer key 110 to the main line position as shown, and depressing the transfer operation key 111 which results in energization of the main line auxiliary transfer relay 79. This places the dispatching office battery on the main line conductors 13 and 14 and operates the main line auxiliary transfer relay 79′ at the substation, resulting in operation of the line transfer control relays 80 and 80′ to the main line position.

Continuous telemetering may be maintained during normal operation of the system, without interference with either the direct-current supervisory control equipment or the telephone equipment. The tone transmitters 32 and 33 at the dispatching office continuously apply voltages to the signal channel proportional to the quantities to be metered, but of their respective frequencies. These voltages are received at the dispatching office by the receivers 35 and 36 which are selectively responsive to their respective frequencies. Since these frequencies are well below the 500 cycle, lower limit of the high pass filters HPF between the telephone equipment and the signal channel, no interference results therebetween.

In order to ring the remote station 40, the operator depresses the telephone call key 41*k* at the dispatching office, completing an obvious energizing circuit for the telephone ringing timing relay 71. Relay 71 picks up release relay 72, which in turn completes an energizing circuit for the telephone selection relay 73.

Relay 73 performs several functions. It iniates selection of the telephone point at the substation by completing an energizing circuit for the selection start relay 216 at armature *f*, through placing positive on conductor 235 of Boswau, and shunts down the individual point relay 131 at armature *e* just as does the point selection key 124 of Boswau.

In addition, relay 73 seals itself in through armature *d*, sets up a release circuit through armature *c* to the upper armature of the release key 103 for picking up the reset relay 214, prepares an operate code circuit by providing a connection through armature *b* for placing positive on the control code start relay 215 in the manner that the master control key 102 of Boswau does when the point selection check relay 134 picks up upon receipt of the point selection check code, and finally, provides a holding circuit through its armature *a*, armature *a* of the operation and check code stop 210 and armature 214*a* of the reset relay 214.

Accordingly, the telephone point at the substation is selected, and the operate or control code is transmitted upon receipt of the check code. Auxiliary relay 133 is energized through armature *a* of the code control relay 310 and provides an obvious energizing circuit for keying the substation carrier current telephone equipment to ring the remote station 40.

When the call key 41*k* is released, timing relay 71 is held energized until relay 210 picks up to stop the operation code. Upon deenergization, relay 71 vibrates and periodically energizes the telephone release relay 72, maintaining it in the energized position for a predetermined time, during which the telephone point remains selected and the telephone at the remote station 400 continues to ring. At the end of this time, relay 72 drops, connecting positive to the reset relay 214 through armature *b* and its back contact, and armature *c* of relay 73, in the same manner as does the release key 103 of Boswau. The supervisory equipment is thereupon released in the usual manner, and telephone conversation may be carried on without affecting the supervisory equipment.

A call from the remote station 40 results in operation of the ringing relay 42*r* at the substation, which completes an obvious energizing circuit for the telephone point supervisory relay 314. The point selection code is transmitted followed by an operation code corresponding to automatic closing of a breaker, and the telephone bell at the dispatching office is rung when the point supervisory receiving relay 130 operates, completing an obvious energizing circuit therefor through armature 175 of relay 130.

When the ringing relay is deenergized, the point supervisory relay 314 operates again, and the telephone bell will be silenced when the supervisory receiving relay drops, in the usual manner, in response to receipt of a breaker trip code. Conversation may be carried on in the usual manner without affecting the supervisory control equipment.

From the above description and the accompanying drawings, it will be apparent that I have provided in a simple and effective manner for obtaining telephone communication between a dispatching office and a station which is remote from a substation through a supervisory control system connecting the dispatching office and substation. Automatic transfer of the supervisory control equipment is effected to provide the maximum continuity of service between the dispatching office and the substation. Continuous telemetering may be readily maintained over the signal channel without interference with the supervisory control equipment or the communication equipment. By providing for automatically selecting the telephone point, ringing the remote station for a predetermined time and then resetting the supervisory control equipment a simple and effective communication system is provided.

Since certain changes may be made in the above-described construction and different embodiments of the invention may be made without departing from the spirit and scope thereof, it is intended that all the matter contained in the above description and shown in the accompanying drawings, shall be considered as illustrative and not in a limiting sense.

I claim as my invention:

1. In a supervisory control system, supervisory control equipment at a dispatching office and a remote substation connected by main and spare signal channels for transmitting and receiving coded signals over one of said channels, transfer means normally connecting the supervisory control equipment to the main channel and operable to connect the supervisory equipment to the spare channel, and supervision means including means for normally maintaining a line supervision current flowing in the main signal channel separate and distinct from said coded signals, and relay means normally responsive to said current operable in response to a fault on the main channel which appreciably reduces said current to effect operation of the transfer means.

2. In combination with supervisory control equipment at a dispatching office and a substation connected by main and spare signal channels for transmitting and receiving coded signals of one polarity over one of said channels, telephone equipment at the dispatching office and substation, transfer means normally connecting the supervisory control equipment to the main channel and the telephone equipment to the spare channel, said transfer means being operable to disconnect the telephone equipment from and connect the supervisory control equipment to the spare channel, and supervision means including means normally applying a supervision potential to the main channel opposite in polarity to said coded signals, and a fault supervision relay normally responsive to said potential operable in response to loss of said potential on the main channel to effect such operation of the transfer means.

3. A supervisory control system comprising, supervisory control equipment at a dispatching office and at a substation connected by a main signal channel and a spare signal channel for transmitting and receiving coded signals over one of said channels, telephone equipment at the dispatching office and substation including means for producing a relatively low frequency ringing voltage, transfer means normally connecting the telephone equipment to the spare channel and the supervisory control equipment to the main channel including relay means connected to the spare channel and choke means rendering said relay means non-responsive to said low frequency ringing voltage. said transfer means being operable to disconnect the telephone equipment from the spare channel and connect the supervisory control equipment thereto, and supervision means including means for applying a line supervision potential to the main channel which is separate and distinct from said coded signals, a line supervision relay normally responsive to said potential operable in response to a loss of said potential as a result of a fault on the main channel to effect such operation of the transfer means, and means operable in response to the transmission of coded signals for rendering the line supervision means ineffective to effect operation of said transfer means.

4. In a supervisory control system, supervisory control equipment at a dispatching office and at a substation having a pair of signal channels extending therebetween for transmitting and receiving coded signals over one of said channels, telephone equipment at the dispatching office and the station including means producing a low frequency ringing voltage, transfer means at the dispatching office and substation normally connecting the supervisory control equipment to one of the channels and the telephone equipment to the other channel operable to disconnect the telephone equipment from and connect the supervisory equipment to the other channel, supervision means including means normally applying a line supervision potential to the main channel independently of said coded signals and relay means selectively responsive to said potential operable in response to a fault condition on said one channel which reduces said potential below a predetermined value, control means at the dispatching office operable in response to operation of the supervision means to effect operation of the transfer means at the dispatching office and apply a control voltage to said other channel, and delayed operation relay means connected to the spare line disposed to operate the transfer means at the substation.

5. In a supervisory control system, supervisory control equipment at a dispatching office and at a substation having a pair of signal channels extending therebetween for transmitting coded signals of one polarity over one of said channels to effect supervisory control operations, telephone equipment at the dispatching office and the station, transfer means disposed to connect the supervisory equipment to one of the channels and the telephone equipment to the other, said transfer means being operable to disconnect the telephone equipment from and connect the supervisory control equipment to said other channel, circuit means disposed to normally energize said one signal channel at a relatively low level with a polarity opposite from that of said signals, line supervision means including relay means responsive to termination of said energization to effect operation of the transfer means, and control means including an auxiliary line supervision relay disposed to be energized in response to transmission and reception of coded signals during supervisory control operations to prevent operation of the transfer means.

6. In combination, supervisory control equipment at a dispatching office and a substation connected to each other by a metallic signal channel and to a remote station by a carrier frequency communication channel extending between the remote station and the substation, telephone equipment at the dispatching office, carrier frequency telephone equipment at the remote station and at the substation, control means at the dispatching office for effecting operation of the supervisory control equipment to transmit a coded signal to the substation for effecting at least a predetermined timed ringing operation through the supervisory control equipment and the carrier equipment at the substation to the remote station, and control means at the substation responsive to receipt of a ringing signal from the remote station through the carrier equipment to effect operation of the supervisory control equipment at the substation to effect ringing of the telephone equipment at the dispatching office through the transmission of a coded supervisory control signal.

7. A supervisory control system comprising, supervisory control equipment at a dispatching office and at a substation connected by a telephone signal channel including sending and receiving means for producing and receiving direct current coded impulse signals over said channel, metering means including frequency transmitters for producing metering voltages of different frequencies and receiving means responsive to said different frequencies, and circuit means including insulating transformers connecting said transmitters and receivers to the channel.

8. In a supervisory control system, supervisory control sending and receiving equipment at a dispatching office and a substation connected by a metallic conductor signal channel, said equipment being disposed to transmit and receive direct current coded signal impulses over said channel, a plurality of metering transmitters at the substation operable to produce metering voltages of different audio frequencies, a plurality of metering receivers at the dispatching office one responsive to each of said frequencies, and transformer means coupling the transmitters and receivers to the signal channel intermediate the supervisory control equipment.

9. A supervisory control system comprising, direct current coded impulse signal supervisory control equipment at a dispatching office and at a substation having a metallic signal channel therebetween, telephone equipment at the dispatching office, carrier frequency telephone equipment at the substation and a remote station connected to the substation by a carrier frequency communication channel, means responsive to receipt of a carrier signal at the substation for effecting operation of the supervisory control equipment for communicating with the telephone equipment at the dispatching office, circuit means including a high pass filter and an insulating transformer connecting the telephone equipment to the signal channel for communication with the telephone equipment of the remote station at the dispatching office and the substation, and continuous metering means connected to the channel through the insulating transformers including a relatively low frequency metering transmitter and receiver.

10. A supervisory control system comprising, supervisory control equipment at a dispatching office and a substation having a pair of signal channels therebetween for transmitting and receiving coded signals over one of said channels, telephone equipment at the dispatching office, carrier communication equipment at the substation and a remote station connected by a carrier communication channel, said carrier communication equipment being operable to effect operation of the supervisory control equipment to transmit coded signals for selecting the telephone equipment at the dispatching office, local telephone equipment at the dispatching office and the substation, transfer means normally connecting the supervisory control equipment to one signal channel and the local telephone equipment to the other signal channel, said transfer means being operable to disconnect the supervisory control equipment and the local telephone equipment from said channels and connect the supervisory control equipment to said other channel, line supervision means including means connected to apply a line supervision potential to the main channel and relay means normally responsive to said potential operable in response to a loss of said potential as a result of a fault condition on said one channel to effect operation of said transfer means, insulating transformers at the dispatching office and substation connected intermediate the signal channels and the telephone equipment, and continuous telemetering means including a relatively low frequency transmitter and receiver connected to one of said channels by the transfer means.

11. In a supervisory control system having supervisory control equipment with a plurality of control points at a dispatching office and at a substation connected by a metallic signal channel, telephone equipment at the dispatching office connected to the signal channel, carrier frequency telephone equipment at the substation disposed to be operated through a point of the supervisory control equipment for communicating with carrier frequency telephone equipment at a station remote from the substation, said carrier frequency telephone equipment at the substation being operable in response to a carrier frequency signal from the remote station to effect operation of the supervisory control equipment to select the telephone equipment at the dispatching office, and control means at the dispatching office operable to initiate operation of the supervisory control equipment over the metallic channel to operate the carrier frequency equipment at the substation and transmit a carrier signal from the substation to the remote station to ring at the telephone equipment remote station for a predetermined time, said control means being operable to provide a reset circuit for the supervisory control equipment at the end of said time.

12. In combination with supervisory control equipment having a plurality of control points at each of a dispatching office and a substation which have a signal channel therebetween, telephone equipment at the dispatching office connected to the signal channel, circuit means for selecting said telephone equipment through the supervisory equipment from the substation, carrier frequency telephone equipment at a station remote from the substation connected to control carrier frequency telephone equipment at the substation to effect a ringing operation of the telephone equipment at the dispatching office through a point of the supervisory control equipment, and control means including a time delay relay at the dispatching office and circuit means connected to select the telephone point and effect operation of the supervisory control equipment at the dispatching office and the substation to effect a ringing operation of the carrier frequency telephone equipment at the remote station from the substation for a predetermined interval of time, said time delay relay being operable to reset the supervisory control equipment at the end of said predetermined time.

13. Supervisory control and communication equipment comprising, supervisory control sending and receiving means respectively operable to produce and operate in response to coded signals, a relay operable to reset the supervisory equipment, switch means operable to effect operation of the sending means to produce a coded point selection signal which results in a check code signal being received, and timing means controlled by said switch means operable in response to operation of the receiving means as a result of receipt of the check code signal to effect operation of the sending means to transmit a control code signal for a predetermined timed interval and then effect operation of the reset relay.

14. Supervisory control and communication equipment comprising, supervisory control receiving means operable in response to coded signals to select a particular communication point, supervisory control sending means operable to produce coded signals in response to selection of said point, carrier frequency transmitting means, relay means operable in response to operation of the receiving means after selection of said point to effect operation of the carrier frequency transmitter, carrier frequency receiving means, and means for effecting operation of the supervisory control sending means in response to operation of the carrier frequency receiving means upon receipt of a carrier frequency signal.

15. Supervisory control equipment comprising, a pair of terminals for connection to a signal channel, supervisory control means including a line relay disposed to be energized in accordance with coded signals of one polarity disposed to be received at said terminals, supervision means including a supervision relay and circuit means including rectifier means connecting the supervision relay in circuit relation with the line relay and terminals for energization in response to a supervision potential having a polarity which is the reverse of said coded signals, and transfer means selectively operable in response to energization of deenergization of the supervision means to provide for connecting said terminals to one signal channel or another signal channel.

16. Supervisory control apparatus comprising, supervisory control sending and receiving means respectively operable to produce and operate in response to coded impulses, switch means normally operable to provide for connecting the supervisory control means to terminals of a main signal channel, and relay means disposed to be connected to terminals of a spare signal channel operable to effect operation of the switch means to disconnect the supervisory control means from the terminals of the main signal channel and connect them to the terminals of the spare signal channel in response to energization of said terminals.

17. Supervisory control and communication apparatus comprising, supervisory control sending and receiving means operable respectively to produce and operate in response to coded signals, carrier transmitting and receiving means associated with said supervisory control sending and receiving means, said carrier transmitting means being operable in response to operation of the supervisory control receiving means to transmit a carrier frequency signal, telephone equipment at a remote location, carrier receiving means at said remote location operable to ring the telephone equipment in response to operation of the carrier transmitting means, carrier transmitting means at the remote station operable in response to operation of the telephone equipment at the remote station to effect operation of the carrier receiving means associated with the supervisory control equipment, and relay means operable in response to operation of its associated carrier receiving means for effecting operation of the supervisory control sending means to produce coded signals.

WILLARD A. DERR.

References Cited in the file of this patent

UNITED STATES PATENTS

| Number | Name | Date |
|---|---|---|
| 1,469,869 | Affel | Oct. 9, 1923 |
| 1,565,155 | Jammer | Dec. 8, 1925 |
| 1,577,778 | White | Mar. 23, 1926 |
| 1,632,078 | Jammer | June 14, 1927 |
| 2,091,301 | Boswau | Aug. 31, 1937 |
| 2,272,070 | Reeves | Feb. 3, 1942 |
| 2,420,871 | Derr | May 20, 1947 |
| 2,449,490 | Lenehan | Sept. 14, 1948 |

FOREIGN PATENTS

| Number | Country | Date |
|---|---|---|
| 234,461 | Switzerland | Jan. 16, 1945 |